(12) United States Patent
Suzuki

(10) Patent No.: US 6,494,472 B2
(45) Date of Patent: **\*Dec. 17, 2002**

(54) SUSPENSION FRAME CONSTRUCTION

(75) Inventor: Tomoyuki Suzuki, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 131 days.

This patent is subject to a terminal disclaimer.

(21) Appl. No.: 09/799,258

(22) Filed: Mar. 5, 2001

(65) Prior Publication Data

US 2001/0020774 A1 Sep. 13, 2001

(30) Foreign Application Priority Data

Mar. 13, 2000 (JP) ........................................ 2000-068029

(51) Int. Cl.[7] .............................................. B62D 21/11
(52) U.S. Cl. ............................ 280/124.109; 280/785; 280/788
(58) Field of Search .............................. 280/785, 788, 280/124.109; 180/311, 312

(56) References Cited

U.S. PATENT DOCUMENTS 4,501,436 A * 2/1985 Ishida ........................ 180/291
4,887,841 A * 12/1989 Cowburn et al. ........... 267/148
6,409,216 B2 * 6/2002 Suzuki ................ 280/124.109

FOREIGN PATENT DOCUMENTS

JP 7-179180 A 7/1995

* cited by examiner

*Primary Examiner*—Paul N. Dickson
*Assistant Examiner*—L. Lum
(74) *Attorney, Agent, or Firm*—Alston & Bird LLP

(57) ABSTRACT

There is provided a suspension frame construction capable of increasing rigidity when a braking load, a lateral load, or an engine mounting load is applied to a suspension frame. In the suspension frame construction comprising an upper plate and a lower plate joined to each other to form the suspension frame; and front- and rear-side suspension lower arm support portions provided at both ends, right and left, of the suspension frame, the rear-side suspension lower arm support portion is formed by opposing the upper plate 8 and the lower plate 9 to each other at a fixed distance and a rear-side arm portion 10*b* of a suspension lower arm 10$_1$, 10$_2$ is pivotally supported between the opposed portion of the upper plate 8 and the lower plate 9, and a reinforcing wall portion 9*f* for connecting the upper plate 8 and the lower plate 9 to each other is provided on the proximal end side of the pivotally supporting portion.

12 Claims, 9 Drawing Sheets

SUSPENSION FRAME CONSTRUCTION

FIELD OF THE INVENTION AND RELATED ART STATEMENT

The present invention relates to a suspension frame construction for supporting a suspension lower arm, an engine mounting member, and the like.

Generally, the vehicle body constructions of motor vehicles are broadly divided into a framed construction used for motor trucks and the like and a frameless construction used for passenger cars and the like. The frameless construction incorporates side members and cross members as a part of body in place of a frame to increase the torsional rigidity. A chassis part is usually attached directly to the body, but, on some vehicles, it is attached to a partial frame, what is called a subframe, and then is assembled to the body.

The subframe is also referred to as a suspension frame because suspension lower arms are usually attached to both sides of the subframe. Hereafter, the subframe and the like are given a general name of a suspension frame.

The suspension frame is assembled to the vehicle body as an assembled part after a suspension lower frame, a stabilizer, and the like are attached thereto. The suspension frame is generally composed of an upper plate, a lower plate, and lower arm mounting brackets as a basic construction.

FIGS. 9 to 11 show a construction of a conventional suspension frame (Japanese Patent Provisional Publication No. 7-179180).

A suspension frame 100 is supported on a pair of side members 101, 101 at both sides thereof, and suspension lower arms 102, 102 are attached to both sides of the suspension frame 100. Between the suspension frame 100 and a cross member 103 installed on the front is provided a center member 104, to which an engine 105 is assembled.

The suspension frame 100 is usually disposed at the lower part of an engine room isolated by a dash panel 106, and is fitted with various fittings. The dash panel 106 is fitted with a steering knuckle 107 via brackets 108.

As shown in FIGS. 12 to 14, the suspension frame 100 is formed by joining an upper plate 109 and a lower plate 110, which are formed by pressing a steel plate etc., by welding or other means, and at both sides, right and left, of the suspension frame 100 are provided vehicle body mounting portions h, i and j, and in the central portion thereof are provided engine mounting member mounting portions k. At both sides in the vehicle width direction of the suspension frame 100, a pair of suspension lower arm mounting portions 100a and 100d are provided. In the suspension lower arm mounting portion 100a on the front side of the vehicle body is provided a lower arm mounting bracket 111 in a cantilever state.

The lower arm mounting bracket 111 is formed substantially into a square box shape with one side being open by pressing or other means, and the opposed wall faces 111a and 111b thereof are provided with pivotally supporting portions 112, 112 for the suspension lower arms 102, 102. This lower arm mounting bracket 111, which is supported on the outside of the vehicle body mounting portions h, i and j in a cantilever manner, has a construction that provides low rigidity and is disadvantageous in terms of driving stability and vibration noise.

To mount the lower arm mounting bracket 111, as shown in FIG. 14, a distal end portion 109a of the upper plate 109 is lapped partially on and joined to the upper face of the lower arm mounting bracket 111. Also, the distal end of the lower plate 110 is butt-welded to the wall face of the lower arm mounting bracket 111. Therefore, a reinforcement 113 is installed between the upper plate 109 and the lower plate 110 to reinforce the mounting portion of the lower arm mounting bracket 111. Further, a flange portion 114 is provided along the open end portion of the lower arm mounting bracket 111 to increase the rigidity of the bracket 111.

The suspension frame 100 is subjected to the severest condition when a longitudinal load is applied thereto (for an actual vehicle, for example, when the brake is applied or when a wheel falls into a pothole).

When a braking load is applied to the suspension frame 100, as shown in FIG. 15, the mounting portion 100a of the lower arm mounting bracket 111 is put into a deformation mode of being opened to the outside while being twisted as indicated by the arrow ①, and a central portion 100b of the suspension frame 100 is put into a deformation mode of being sunk as indicated by the broken line ②.

The central portion 100b of the suspension frame 100 is also sunk in the same manner by a load applied by the engine mounting member at the time of sudden start.

On the other hand, as shown in FIG. 16, when a load is applied in the lateral direction, the mounting portion 100a of the lower arm mounting bracket 111 is twisted to the inside as indicated by the arrow ③. As a result, one of the lower arm mounting portions 100d on the vehicle body rear side of the suspension frame 100 is deformed upward as indicated by the arrow ④ and the other thereof is deformed downward as indicated by the arrow ⑤. Also, on both sides of the central portion 100b of the suspension frame 100, one side is deformed upward as indicated by the arrow ④ and the other side is deformed downward as indicated by the arrow ⑤. Thus, the suspension frame 100 is put into a deformation mode of being wavy.

As is apparent from the above-described deformation modes, the rigidity around the opening portion of the lower arm mounting bracket 111 is low in the case where the suspension frame 100 is formed merely by two upper and lower plates joined to each other. Near the opening portion, the vehicle body mounting portions lie. If the rigidity of this portion of the suspension frame 100 is low, therefore, there is a possibility that the first-order natural frequency of the suspension frame 100 resonates with the vehicle body.

OBJECT AND SUMMARY OF THE INVENTION

The present invention has been made to solve the above problems, and accordingly an object thereof is to provide a suspension frame construction capable of increasing rigidity when a braking load, a lateral load, or an engine mounting load is applied to a suspension frame.

To solve the above problems, the present invention provides a suspension frame construction comprising an upper plate and a lower plate joined to each other to form a suspension frame; and front- and rear-side suspension lower arm support portions provided at both ends, right and left, of the suspension frame, wherein the rear-side suspension lower arm support portion is formed by opposing the upper plate and lower plate to each other at a fixed distance and a rear-side arm portion of a suspension lower arm is pivotally supported between the opposed portion of the upper plate and lower plate, and a reinforcing wall portion for connecting the upper plate and lower plate to each other is provided on the proximal end side of the pivotally supporting portion.

Also, the present invention provides a suspension frame construction comprising an upper plate and a lower plate joined to each other to form a suspension frame; and suspension lower arm support portions extending to substantially front and lateral sides, which is provided at both ends, right and left, of the suspension frame, wherein an outer wall portion is formed in the suspension lower arm support portion extending to substantially front side, and a reinforcing wall portion continuous with the outer wall portion is provided at the proximal end of the lateral-side extending portion provided on the rear end side of the outer wall portion.

Further, the present invention provides a suspension frame construction comprising an upper plate and a lower plate joined to each other to form a suspension frame; and front- and rear-side suspension lower arm support portions provided at both ends, right and left, of the suspension frame, wherein the rear-side suspension lower arm support portion is formed by opposing the upper plate and lower plate to each other at a fixed distance and a rear-side arm portion of a suspension lower arm is pivotally supported by a vertical shaft between the opposed portion of the upper plate and lower plate, and a reinforcing wall portion for connecting the upper plate and lower plate to each other is provided on the proximal end side of the pivotally supporting portion.

DETAILED DESCRIPTION OF PREFERRED EMBODIMENT

An embodiment of the present invention will now be described in detail with reference to the accompanying drawings.

Figure 1:
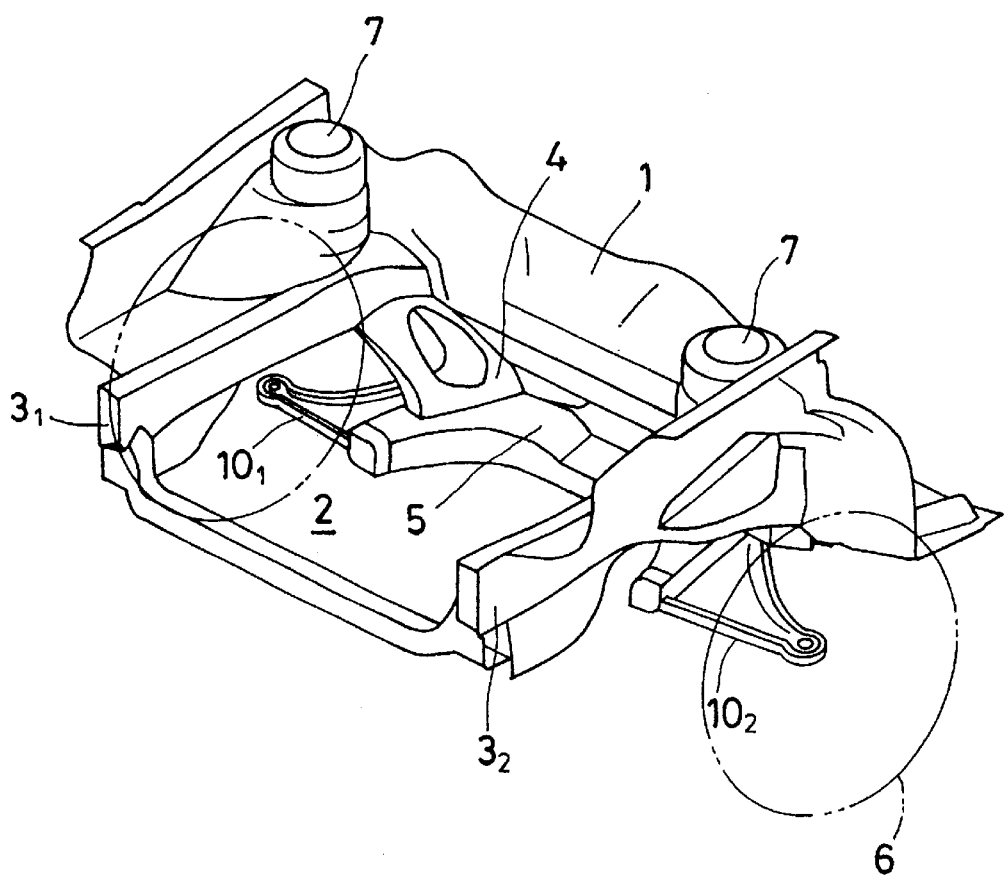
FIG. 1 is a schematic perspective view showing an embodiment of a suspension frame construction in accordance with the present invention.

FIG. 1 shows the vehicle body front part of a motor vehicle. In an engine room 2 isolated by a dash panel 1, a suspension frame 5 is installed to front side members $3_1$ and $3_2$, which are disposed on both sides of a vehicle body, via brackets 4 on the lower face side of the engine room 2. on the outside of the front side members $3_1$ and $3_2$ are provided struts 7 for suspending right and left wheels 6.

The construction of the suspension frame 5 will be described with reference to FIGS. 2 to 8.

Figure 2:
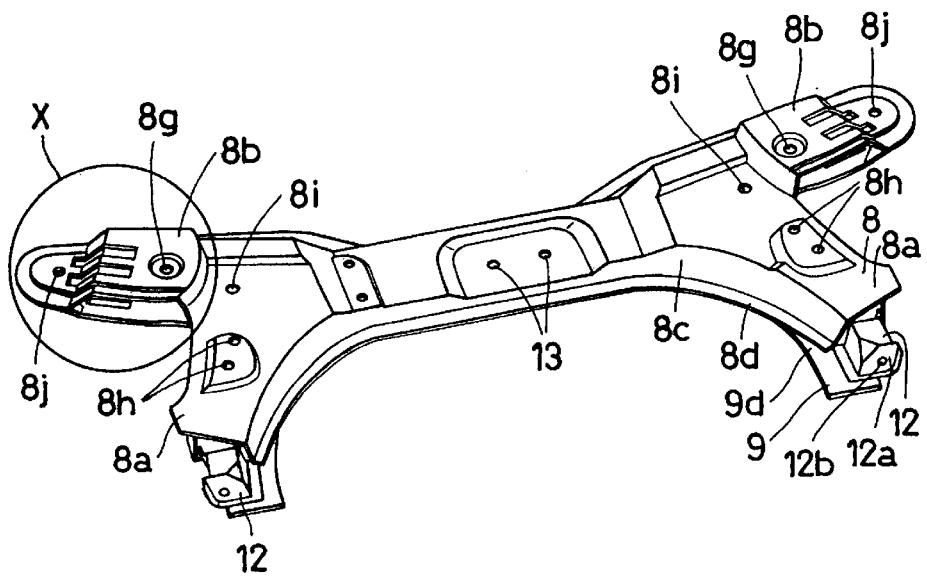
FIG. 2 is a perspective view of the suspension frame construction shown in FIG. 1.
Figure 3:
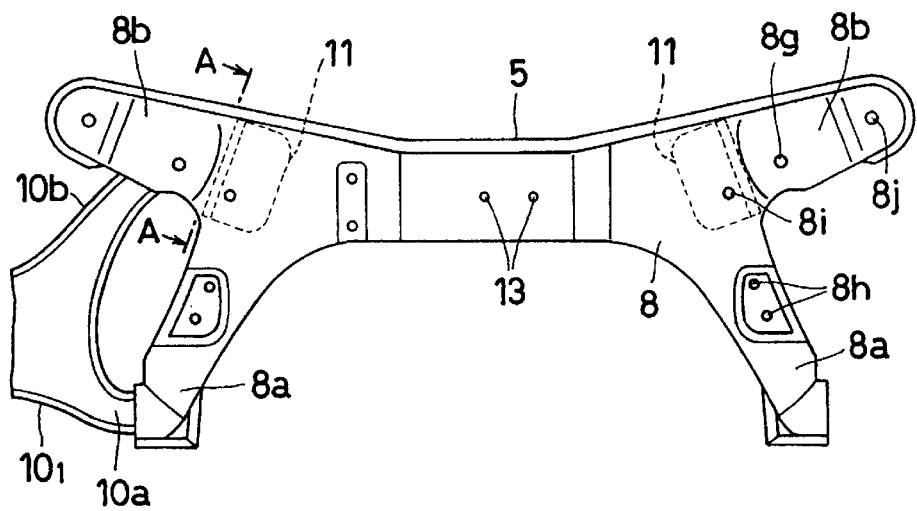
FIG. 3 is a plan view of the suspension frame construction shown in FIG. 2.

As shown in FIGS. 2 and 3, the suspension frame 5 is formed into a substantially closed curved surface construction by joining an upper plate 8 and a lower plate 9, which are formed by pressing, to each other by welding or other means.

For the upper plate 8, the front and rear end portions of a flat steel plate are bent and extend downward, and suspension lower arm support portions 8a and 8b for supporting arms 10a and 10b of suspension lower arms $10_1$ and $10_2$ are provided on both sides, right and left, of the upper plate 8 so as to branch and extend to the substantially front and lateral sides.

Figure 4:
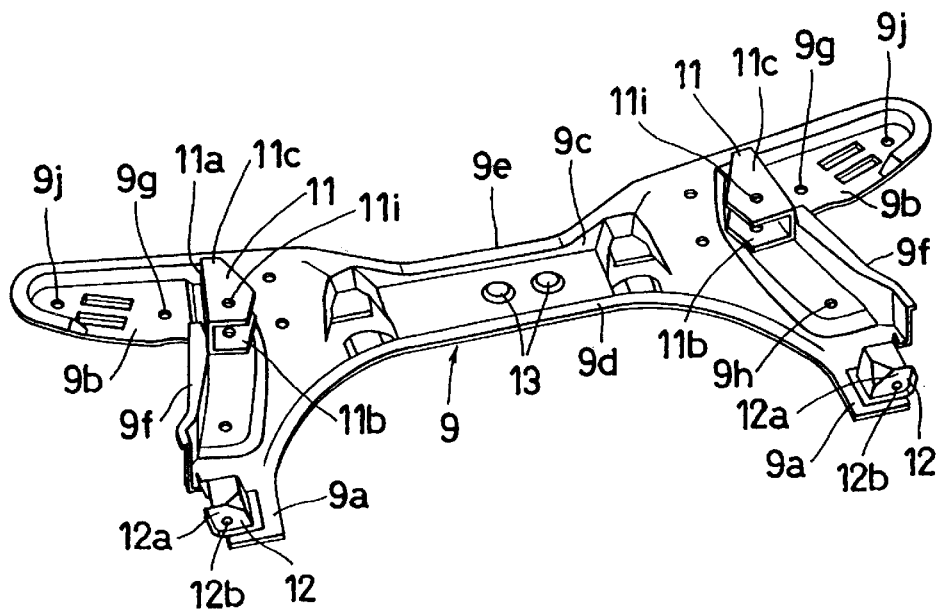
FIG. 4 is a perspective view of a lower plate shown in FIG. 2.
Figure 5:
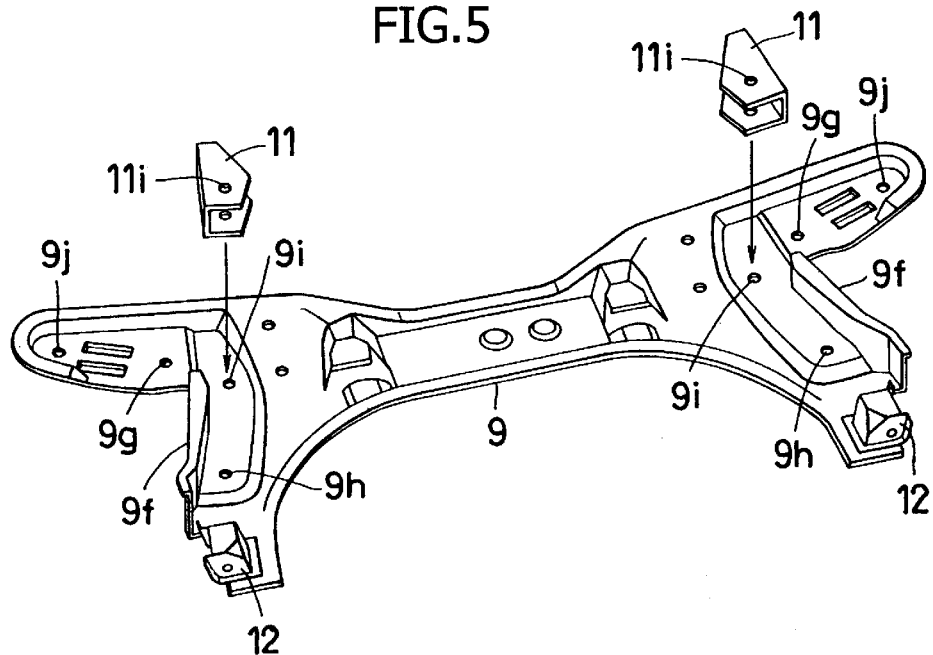
FIG. 5 is a perspective view of the lower plate shown in FIG. 4, in which brackets are detached.

On the other hand, for the lower plate 9, as shown in FIG. 4, the rear end portion of a flat steel plate is bent and extends upward, and suspension lower arm support portions 9a and 9b for supporting arms 10a and 10b of suspension lower arms $10_1$ and $10_2$ are provided on both sides, right and left, of the lower plate 9 so as to branch and extend to the substantially front and lateral sides. On the outside face of the suspension frame 5 ranging from the suspension lower arm support portion 9a to the proximal end portion of the lateral suspension lower arm support portion 9b, a wall portion 9f is erected along the outside edge of the lower plate 9.

Figure 6:
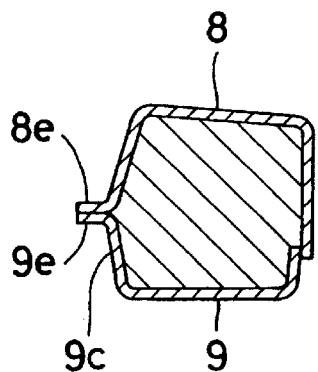
FIG. 6 is a sectional view taken along the line A—A of FIG. 3.

The suspension frame 5 forms a closed cross section by joining a flange portion 8d provided along the edge of a front end falling portion 8c of the upper plate 8 to a front end edge portion 9d of the lower plate 9 and, as shown in FIG. 6, by joining a flange portion 9e provided in a rear end rising portion 9c of the lower plate 9 to a rear edge portion 8e of the upper plate 8. The wall portion 9f of the lower plate 9 is joined to the lower face on each side of the upper plate 8.

In the rear end portion of the wall portion 9f of the lower plate 9, that is, in the proximal end portion of the suspension lower arm support portion 9b, there is provided a substantially U-shaped bracket 11 for forming a reinforcing wall portion 11a that is continuous with the wall portion 9f. This bracket 11 is disposed between the lower plate 9 and the upper plate 8 by joining a lower plate portion 11b thereof to the lower plate 9 beforehand and by bringing an upper plate portion 11c into contact with the upper plate 8 after the upper plate 8 is assembled to the lower plate 9, by which the proximal end portion of the suspension lower arm support portion 9b is isolated from an internal space.

In both end portions, right and left, of the suspension frame 5, suspension lower arm support portions 5a and 5b are formed by joining the upper plate 8 to the lower plate 9.

The suspension lower arm support portion 5a is formed by being supported by the suspension lower arm support portion 8a of the upper plate 8 and the suspension lower arm support portion 9a of the lower plate 9 so as to provide a lower arm mounting bracket 12.

The lower arm mounting bracket 12 is formed substantially into a box shape by pressing or other means, and one side of this box shape is opened so as to form a support portion for a sway shaft of the suspension lower arm 10. In each of front and rear wall faces 12a opposed in the vehicle body longitudinal direction of this box shape, there is provided a mounting hole 12b for mounting the sway shaft of the suspension lower arm 10.

The suspension lower arm support portion 5b is formed by the suspension lower arm support portion 8b of the upper plate 8 and the suspension lower arm support portion 9b of the lower plate 9.

On the other hand, in a substantially central portion of the suspension frame 5 are provided an engine mounting member mounting portions 13. Also, the upper plate 8 and the lower plate 9 are provided with vehicle body mounting portions 8h, 8i and 8j and 9h, 9i and 9j of the suspension frame 5, respectively. The aforementioned bracket 11 is provided with mounting holes 11i corresponding to the vehicle body mounting portions 8i and 9i.

Figure 7:
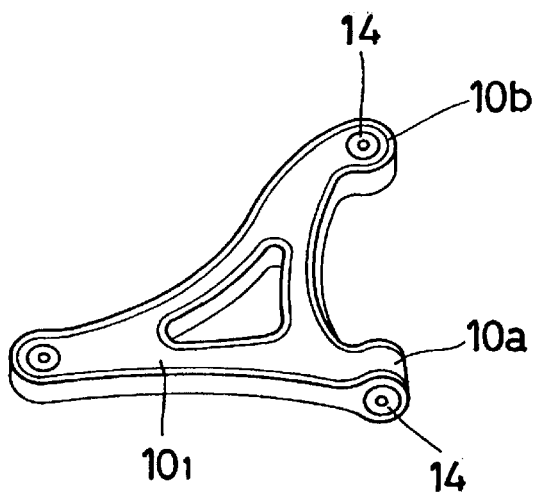
FIG. 7 is a schematic perspective view of a suspension lower arm shown in FIG. 1.
Figure 8:
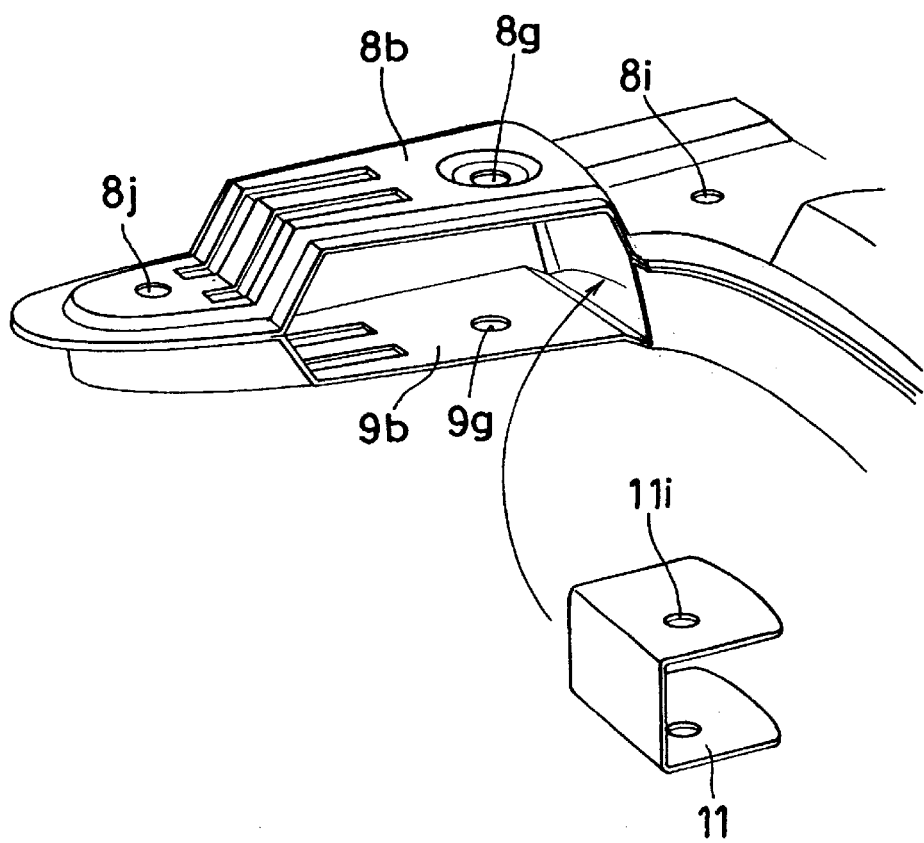
FIG. 8 is an expanded and exploded perspective view of the portion X of FIG. 2.
Figure 9:
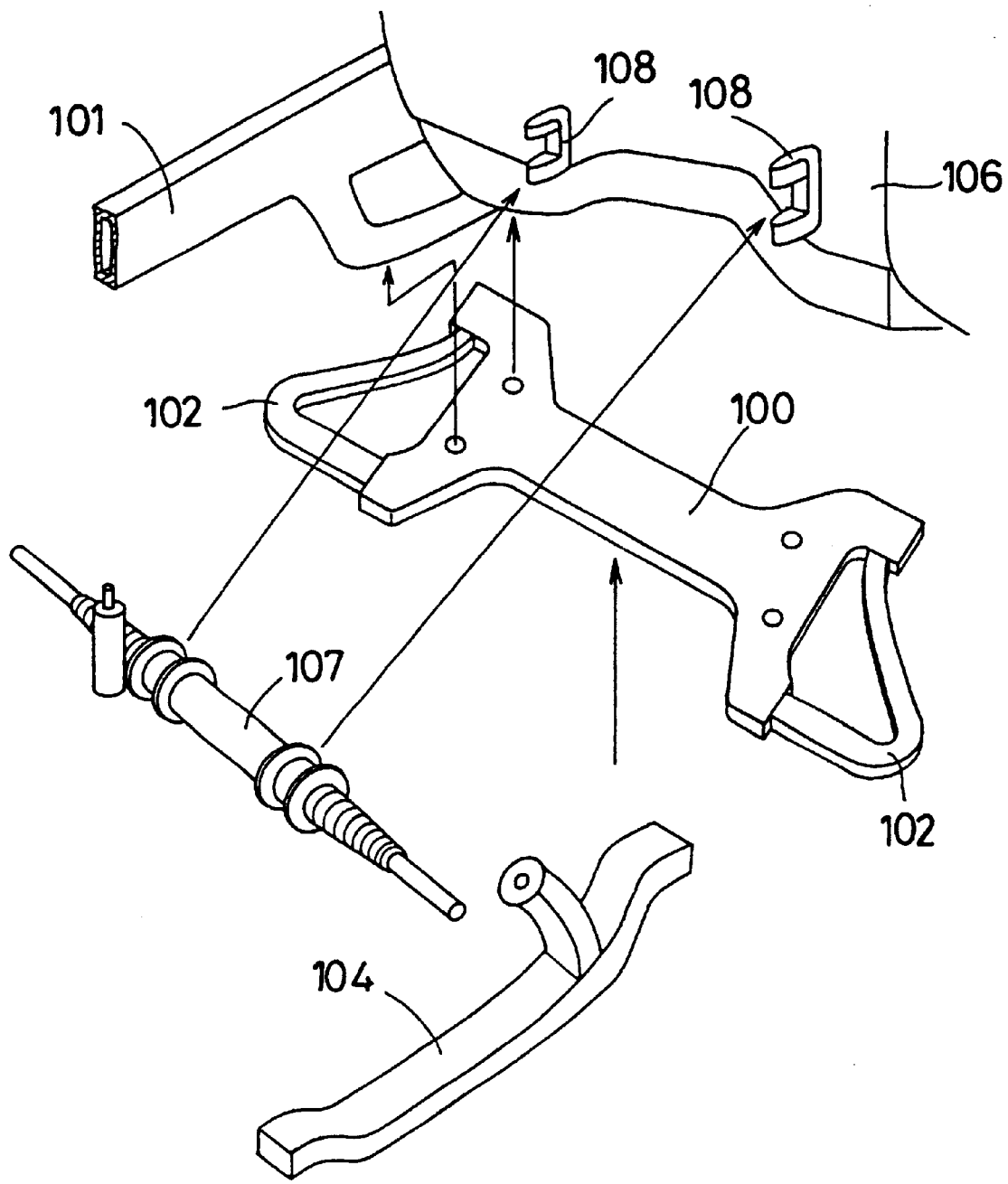
FIG. 9 is a perspective view of a conventional suspension frame construction.
Figure 10:
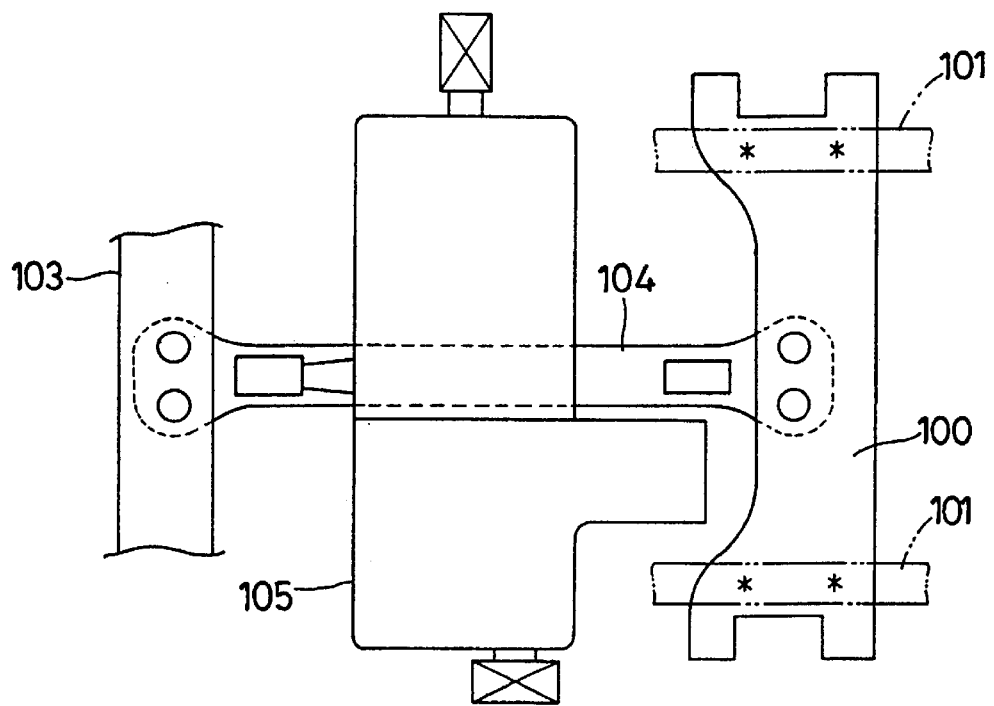
FIG. 10 is a plan view of a conventional suspension frame construction.
Figure 11:
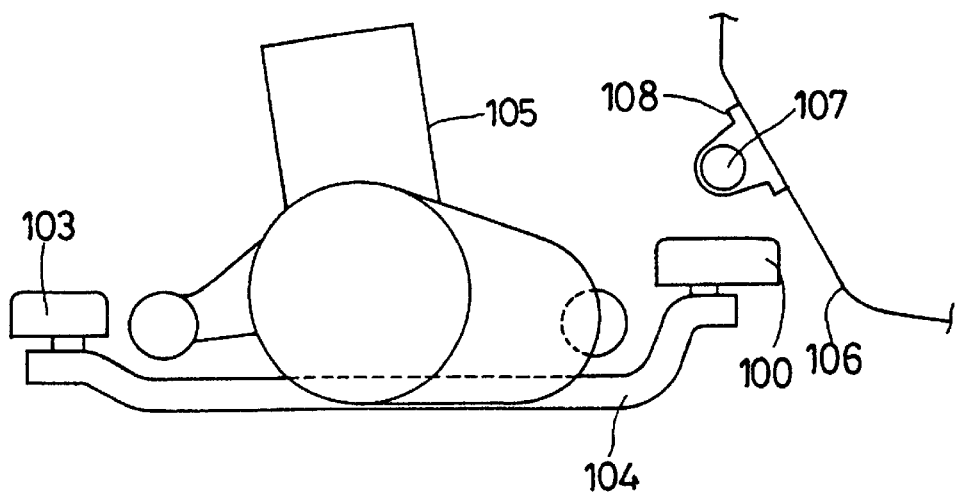
FIG. 11 is a side view of FIG. 9.
Figure 12:
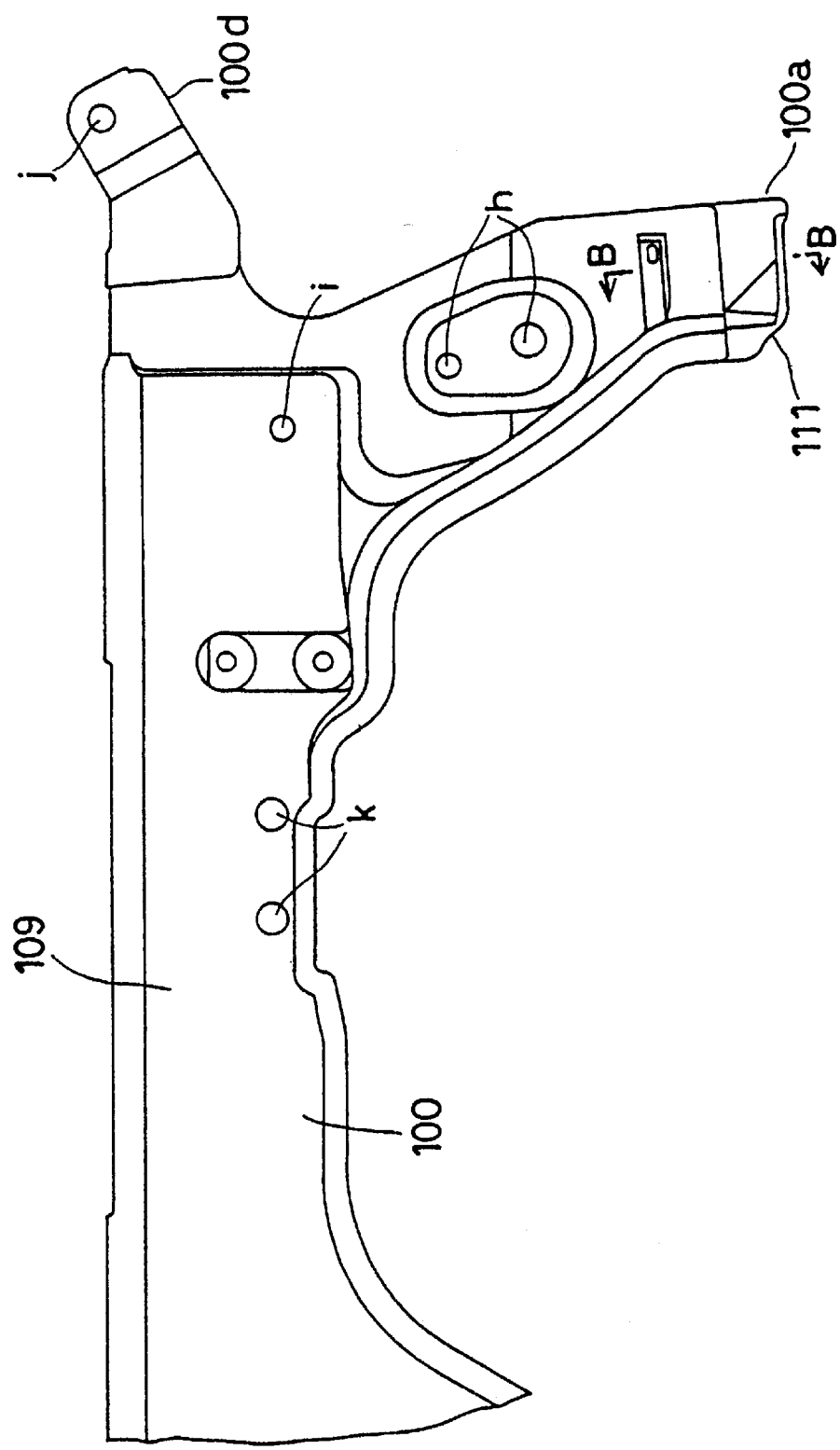
FIG. 12 is a plan view of a conventional suspension frame construction.
Figure 13:
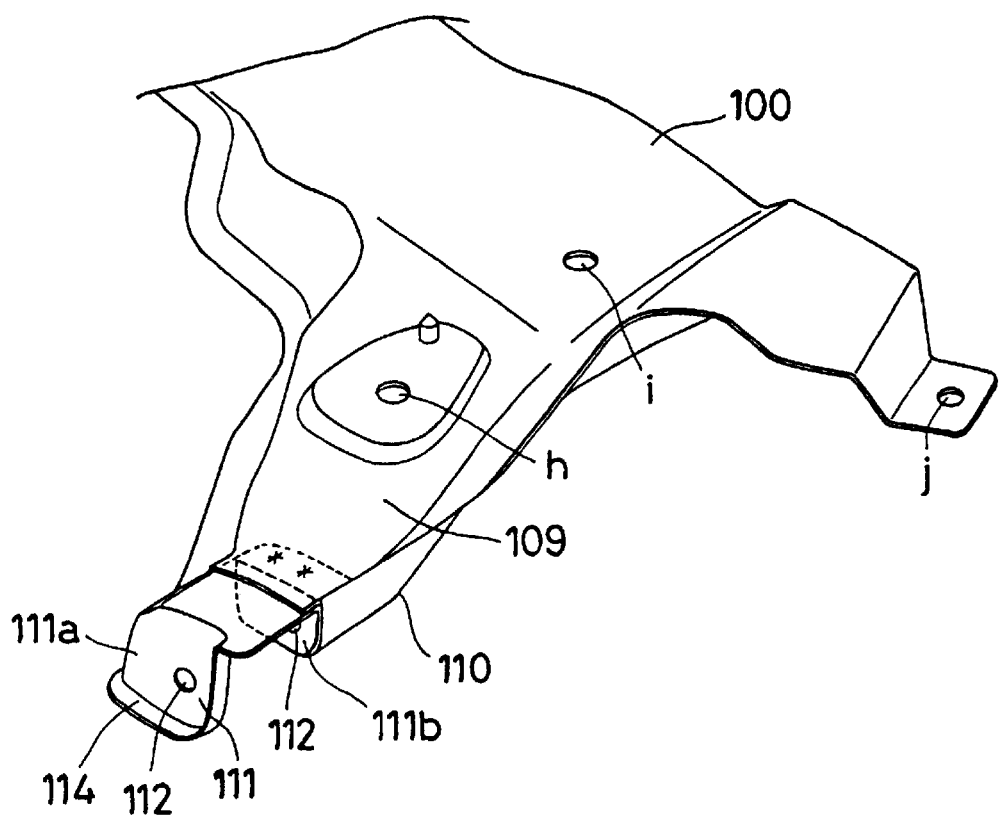
FIG. 13 is a perspective view of a conventional suspension frame construction.
Figure 14:
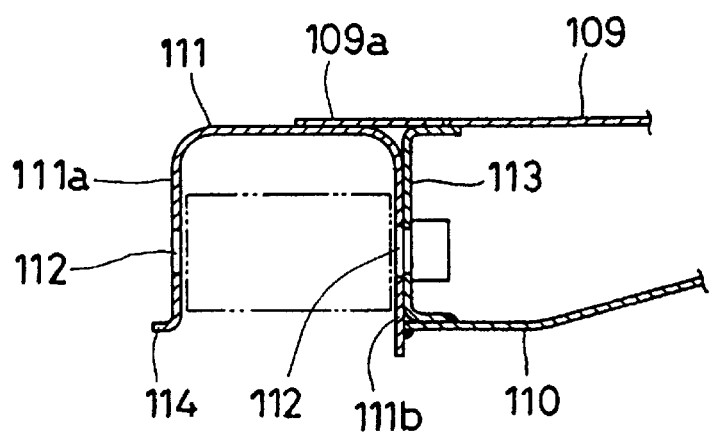
FIG. 14 is a sectional view taken along the line B—B of FIG. 12.
Figure 15:
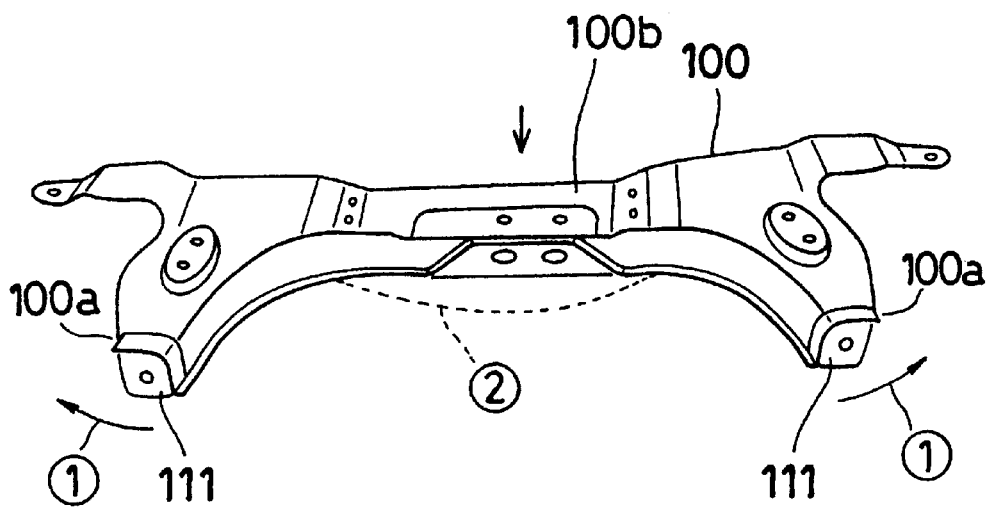
FIG. 15 is a perspective view showing a deformation mode of a conventional suspension frame construction under a braking load.
Figure 16:
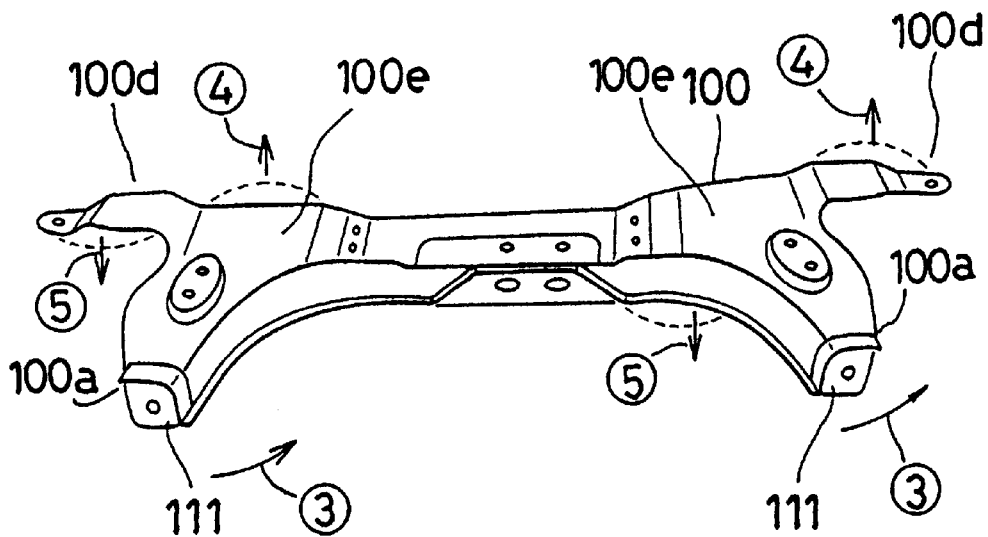
FIG. 16 is a perspective view showing a deformation mode of a conventional suspension frame construction under a lateral load.

Further, in the suspension lower arm support portion 8b of the upper plate 8 and the suspension lower arm support portion 9b of the lower plate 9, there are provided mounting holes 8g and 9g, respectively, for supporting the rear-side arm 10b of the suspension lower arm $10_1$, $10_2$ as shown in FIG. 7 (see FIG. 8). The front-side arm 10a of the suspension lower arm $10_1$, $10_2$ is supported by a horizontal shaft, and the rear-side arm 10b is supported by a vertical shaft. The front-side arm 10a and the rear-side arm 10b each are provided with a bush 14, and the suspension lower arm $10_1$, $10_2$ is supported on the suspension frame 5 so as to be swayed freely by inserting the support shaft in the center of the bush 14.

According to the above-described construction, the wall portion 9f is formed on the outside face of the suspension frame 5 ranging from the suspension lower arm support portion 9a to the proximal end portion of the lateral suspension lower arm support portion 9b. At the rear end of the wall portion 9f of the lower plate 9, that is, in the proximal end portion of the suspension lower arm support portion 9b, the substantially U-shaped bracket 11 is provided. Thus, the reinforcing wall portion 11a of the bracket 11 is formed straight so as to be continuous with the wall portion 9f.

Since the reinforcing wall portion 11a reinforces the closed curved surface of the suspension frame 5, the rigidity of the suspension frame 5 can be increased when a braking force, a lateral force, or an engine mounting load is applied to the suspension frame 5.

Also, since the proximal end portion of the suspension lower arm support portion 9b is isolated from the internal space, the rigidity of the suspension lower arm support portion 9b can be increased.

As shown in FIG. 8, the suspension lower arm support portion 5b of the suspension frame 5 is provided with an increased rigidity by ribs 8k and 9k formed in the vehicle width direction in the suspension lower arm support portion 8b of the upper plate 8 and the suspension lower arm support portion 9b of the lower plate 9, respectively. Further, the suspension lower arm support portion 8b of the upper plate 8 is formed a step higher so that the distance between the suspension lower arm support portion 8b of the upper plate 8 and the suspension lower arm support portion 9b of the lower plate 9 is increased, by which a support portion for the arm 10b of the suspension lower arm $10_1$, $10_2$ is formed. Thus, the distance between the upper plate 8 and the lower plate 9 can be increased only in the mounting portion for the arm 10b of the suspension lower arm $10_1$, $10_2$, so that the rigidity of the suspension frame 5 is not decreased. Since the arm 10b of the suspension lower arm $10_1$, $10_2$ is supported between the upper plate 8 and the lower plate 9, the rigidity can be increased. In particular, since the suspension lower arm support portion 8b and the suspension lower arm support portion 9b are joined to each other on the front and rear end sides and are joined by the bracket 11 at the proximal end side, only a pull-out portion for the arm 10b of the suspension lower arm $10_1$, $10_2$ is open, so that the support portion for the arm 10b can be constructed strongly.

The present invention is not limited to the above-described embodiment. For example, the U-shaped bracket 11 is used to form the reinforcing wall portion 11a in the above-described embodiment. However, a vertical wall may be erected on the lower plate portion 11b or the upper plate portion 11c, or the wall portion 9f may be extended.

Also, the bracket 11 may be formed so that either one of the lower plate portion 11b and the upper plate portion 11c may be joined to the lower plate 9 or the upper plate 8. It is a matter of course that in addition to these changes, any changes can be made without departing from the spirit and scope of the present invention.

As described above, the suspension frame construction in accordance with the present invention can achieve the effects described below.

In claim 1, in a suspension frame construction comprising an upper plate and a lower plate joined to each other to form a suspension frame; and front- and rear-side suspension lower arm support portions provided at both ends, right and left, of the suspension frame, the rear-side suspension lower arm support portion is formed by opposing the upper plate and lower plate to each other at a fixed distance and a rear-side arm portion of a suspension lower arm is pivotally supported between the opposed portion of the upper plate and lower plate, and a reinforcing wall portion for connecting the upper plate and lower plate to each other is provided on the proximal end side of the pivotally supporting portion. Therefore, the rigidity can be increased when a braking force, a lateral force, or an engine mounting load is applied to the suspension frame. The increase in rigidity under the mounting load can eliminate a mass damper.

In claim 2, in a suspension frame construction comprising an upper plate and a lower plate joined to each other to form a suspension frame; and suspension lower arm support portions extending to substantially front and lateral sides, which is provided at both ends, right and left, of the suspension frame, an outer wall portion is formed in the suspension lower arm support portion extending to substantially front side, and a reinforcing wall portion continuous with the outer wall portion is provided at the proximal end of the lateral-side extending portion provided on the rear end side of the outer wall portion. Therefore, the rigidity can be increased when a braking force, a lateral force, or an engine mounting load is applied to the suspension frame.

In claim 3, in a suspension frame construction comprising an upper plate and a lower plate joined to each other to form a suspension frame; and front- and rear-side suspension lower arm support portions provided at both ends, right and left, of the suspension frame, the rear-side suspension lower arm support portion is formed by opposing the upper plate and lower plate to each other at a fixed distance and a rear-side arm portion of a suspension lower arm is pivotally supported by a vertical shaft between the opposed portion of the upper plate and lower plate, and a reinforcing wall portion for connecting the upper plate and lower plate to each other is provided on the proximal end side of the pivotally supporting portion. Therefore, the rigidity can be increased when a braking force, a lateral force, or an engine mounting load is applied to the suspension frame. In particular, since the rear-side arm portion of the suspension lower arm is supported at a fixed distance between the upper plate and lower plate, a shortage of rigidity of the suspension frame can be solved by the reinforcing wall portion for connecting the upper plate and lower plate to each other.

In claim 4, the reinforcing wall portion is molded integrally with a plate portion joined face-to-face to at least either one of the upper plate and lower plate. Therefore, the rigidity of the suspension frame can be increased when a braking force, a lateral force, or an engine mounting load is applied to the suspension frame.

In claim 5, the upper plate and lower plate are joined to each other to form a closed curved surface, and the reinforcing wall portion is provided so as to divide the closed curved surface. Therefore, the rigidity of the suspension frame can be increased when a braking force, a lateral force, or an engine mounting load is applied to the suspension frame.

In claim 6, a plate portion forming the reinforcing wall portion is provided with a hole, and the upper plate and/or lower plate are joined face-to-face to the plate portion so that the hole is aligned with a vehicle body mounting hole in the suspension frame. Therefore, the rigidity of the suspension frame can be increased when a braking force, a lateral force, or an engine mounting load is applied to the suspension frame.

What is claimed is:

1. A suspension frame construction comprising an upper plate and a lower plate joined to each other to form a suspension frame; and front- and rear-side suspension lower arm support portions provided at both ends, right and left, of said suspension frame, wherein said rear-side suspension lower arm support portion is formed by opposing said upper plate and lower plate to each other at a fixed distance and is adapted to pivotally support a rear-side arm portion of a suspension lower arm between said opposed portions of the upper plate and lower plate, said rear-side suspension lower arm support portion further comprising a reinforcing wall portion for connecting said upper plate and lower plate to each other on a proximal end side of said pivotally supporting portion.

2. The suspension frame construction according to claim 1, wherein said reinforcing wall portion is molded integrally with a plate portion joined face-to-face to at least one of said upper plate and lower plate.

3. The suspension frame construction according to claim 1, wherein said upper plate and lower plate are joined to each other to form a closed surface, and said reinforcing wall portion is provided so as to divide said closed surface.

4. The suspension frame construction according to claim 1, wherein a plate portion forming said reinforcing wall portion is provided with a hole, and at least one of said upper plate and said lower plate are joined face-to-face to said plate portion so that said hole is aligned with a vehicle body mounting hole in said suspension frame.

5. A suspension frame construction comprising an upper plate and a lower plate joined to each other to form a suspension frame; and suspension lower arm support portions extending substantially along front and lateral sides at both ends, right and left, of said suspension frame, said suspension lower arm support portions comprising an outer wall portion formed in said suspension lower arm support portion extending substantially along a front side, and a reinforcing wall portion continuous with said outer wall portion at an end of a lateral-side extending portion proximate a rear end side of said outer wall portion.

6. The suspension frame construction according to claim 5, wherein said reinforcing wall portion is molded integrally with a plate portion joined face-to-face to at least one of said upper plate and lower plate.

7. The suspension frame construction according to claim 5, wherein said upper plate and lower plate are joined to each other to form a closed surface, and said reinforcing wall portion is provided so as to divide said closed surface.

8. The suspension frame construction according to claim 5, wherein a plate portion Forming said reinforcing wall portion is provided with a hole, and at least one of said upper plate and said lower plate are joined face-to-face to said plate portion so that said hole is aligned with a vehicle body mounting hole in said suspension frame.

9. A suspension frame construction comprising an upper plate and a lower plate joined to each other to form a suspension frame; and front- and rear-side suspension lower arm support portions provided at both ends, right and left, of said suspension frame, wherein said rear-side suspension lower arm support portion is formed by opposing said upper plate and lower plate to each other at a fixed distance and is adapted to pivotally support a rear-side arm portion of a suspension lower arm by a vertical shaft between said opposed portions of the upper plate and lower plate, said rear-side suspension lower arm support portion further comprising a reinforcing wall portion for connecting said upper plate and lower plate to each other on a proximal end side of said pivotally supporting portion.

10. The suspension frame construction according to claim 9, wherein said reinforcing wall portion is molded integrally with a plate portion joined face-to-face to at least one of said upper plate and lower plate.

11. The suspension frame construction according to claim 9, wherein said upper plate and lower plate are joined to each other to form a closed surface, and said reinforcing wall portion is provided so as to divide said closed surface.

12. The suspension frame construction according to claim 9, wherein a plate portion forming said reinforcing wall portion is provided with a hole, and at least one of said upper plate and said lower plate are joined face-to-face to said plate portion so that said hole is aligned with a vehicle body mounting hole in said suspension frame.

* * * * *